No. 864,545.
PATENTED AUG. 27, 1907.
H. KOPPERS.
GAS FURNACE INSTALLATION.
APPLICATION FILED JUNE 25, 1906.
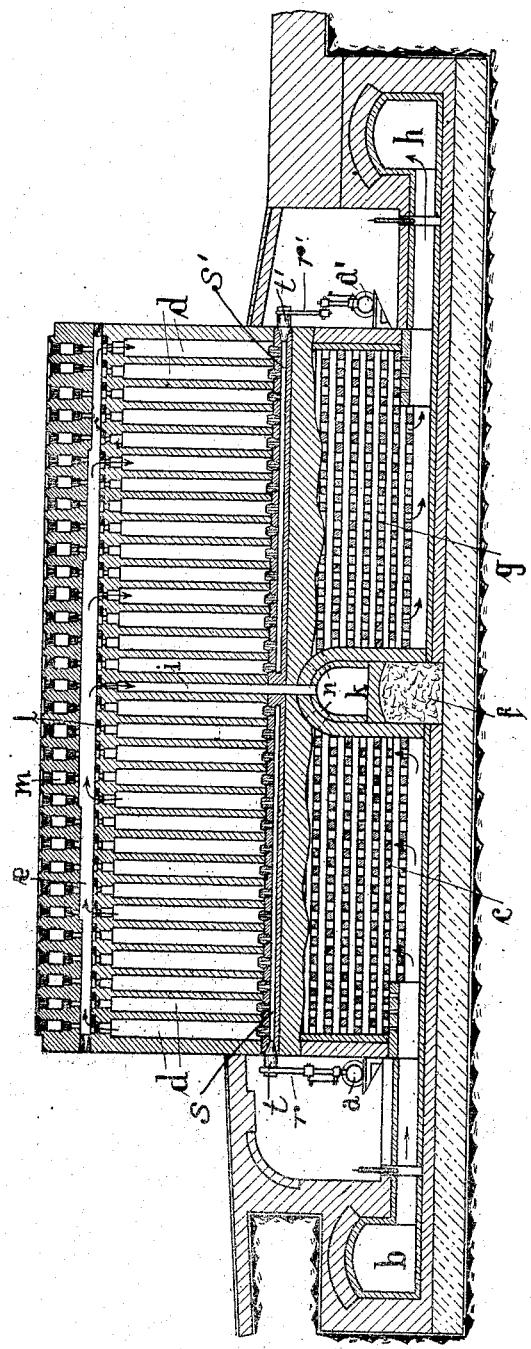
Witnesses
Inventor:
Henrich Koppers
by his attorney

UNITED STATES PATENT OFFICE.

HEINRICH KOPPERS, OF ESSEN-ON-THE-RUHR, GERMANY.

GAS-FURNACE INSTALLATION.

No. 864,545. Specification of Letters Patent. Patented Aug. 27, 1907.

Application filed June 25, 1906. Serial No. 323,203.

*To all whom it may concern:*

Be it known that I, HEINRICH KOPPERS, a citizen of the German Empire, and a resident of 30 Isenbergstrasse, Essen-on-the-Ruhr, Germany, have invented certain new and useful Improvements Relating to Gas-Furnace Installations, of which the following is a specification.

The principle of the recuperation of heat which is known in connection with furnace systems with gas heating of all kinds, whereby the heating gases and the air required for combustion are preliminarily heated by the heat of the burned gases which are passing out, is theoretically to be carried out as a complete cycle only when the product of the weight (volume) and the specific heat of the media serving for combustion, is equal to the product of the corresponding factors of the waste heat. Quite apart from the fact that owing to the kind of the heat recuperation intallations, whether they be the so-called regénerators or so-called recuperators, and the greater or less completeness of their construction in practice, the regard to their efficiency is necessary, and therefore complete recuperation would appear to be impossible, in many cases even the theoretical primary conditions for this are not present. For example in the case of gas retort furnaces, only the air is preliminarily heated in recuperators, as the gas is supplied from the generators, which are usually arranged directly beside or under the retort chamber, at the heat at which it leaves the generators. The like case obtains in the employment of heating gas rich in hydrocarbon, for instance distillation gas in coke furnaces, as the heating of such gases is not permissible, because they decompose at high temperatures; in such cases it is only possible to preliminarily heat the air.

For the purpose of showing the unequal straining of the heat recuperation installation, which is caused by the essential diversity in the specific heats of the air and the waste gases, as regards the parts which serve functions differing spacially or in point of time, when only the air is preliminarily heated, a concrete example will be here given: For one cubic meter of heating gas there flow to the furnace 5.82 kilograms of air with a specific heat of 0.265 between 0° and 1000° Celsius, while 6.44 kilograms of waste gas with the specific heat of 0.34 flow off. Taking 1000° Celsius as departure temperature there are given up in heat recuperation installation 6.44 . 1000 . 0.34=about 2220 calories per cubic meter of heating gas. On the other hand the air flowing in, if heated to 1000° Celsius, can only absorb a quantity of heat representing 5.82 . 1000 . 0.265=about 1550 calories. For one cubic meter of heating gas there is therefore present an excess of heat of 2220−1550=670 calories, which escape with the combustion gases; that is to say the combustion gases have a temperature of about 340° Celsius. Now even if by the regard to the efficiency of the heat recuperating installation this excess experiences a corresponding diminution, on the other hand the combustion gases must retain a certain temperature in order that they ascend in the chimney, so that loss is necessarily entailed in this arrangement. Owing to the small difference of temperature, in spite of the large amount of heat, any further utilization of this waste heat, for example under steam generators, is not possible in practice, that is to say the amount of heat which is theoretically available is distributed throughout an excessive volume. It is known that large amounts of heat of small degrees of temperature, such for example as the heat of the sun as measured by the summer heat of the atmosphere, cannot be utilized economically.

Now the present invention is based upon the broad idea of withdrawing this excess of heat remaining after a recuperation of the heat which has been carried out as completely as possible, at a point in cycle the temperature of which permits of the further economic utilization of this amount of heat in any known manner. That is to say, before the admission of the waste heat into the heat recuperation where the greatest temperature prevails, a portion is separated and conducted separately as waste heat of high value to a steam generator or the like. The ratio of the separated amount to the amount remaining is calculated in such a manner that the latter is just sufficient (having regard to the efficiency) for rationally carrying out the recuperation of the heat and at the end of the process, that is to say upon passing to the chimney, to supply a combustion gas which merely presents the minimum temperature required for the ascent of the combustion gases. By this means the economy of the operation of heat recuperation as a whole is brought as close as possible to the ideal.

In the accompanying drawing there is illustrated, but merely as an explanatory example, the construction of a regenerator coke furnace for utilizing the process, in section along one of the heating walls and through the regenerators arranged beneath the furnace, such as described in Patent No. 818,033, issued to me April 17, 1906.

The furnace is operated with alternate reversals in the usual manner. The gas passes from the gas supply pipes $a$, $a'$, through branches $r$, $r'$, and enters the ducts $s$, $s'$; communicating with heating chambers $d$, through nozzles $t$, $t'$, respectively. The gas burns upwards in the flues $d$ with the air entering through the collector passage $b$, serving as fresh air conduit in accordance with the position of its main slide, and the regenerator $c$, while the waste gases are conducted through the upper horizontal passage $e$ into the other half of the heating wall. The waste gases descend through the regenerator $g$ separated from $c$ at the place at which the draft is reversed by the arched passage $f$, and pass out through the collector passage $h$ which is arranged as chimney. With the change of draft the operation of the regenerators as air heater and waste heat storer constantly varies.

Now if each bond stone at the place where the draft is reversed is provided with a duct $i$ or if at this place a special heating flue $i$ is formed, which opens into a passage $k$ separated from the passage $f$ by an arch, a part of the combustion gases, which may be regulated by the adjustment of the slide $l$ from a passage $m$ in the abutment may be withdrawn directly as waste heat of high value and be conducted beneath the boiler. The reversal of the draft exerts no influence in any way. This separate withdrawal may also be effected by placing the regenerators $c$ and $g$ in communication with the waste heat passage $k$ by means of passages $n$ shown in broken lines. The fact that in this case air passes from the regenerator (which is then acting as air heater) into the passage $k$ instead of actual combustion gases, which air has already been highly heated, is without practical importance. This air merely corresponds to an equivalent part of waste heat, the temperature of which has been transferred to it.

In another connection the manner in which a part of the waste heat is withdrawn at a high temperature is regulated purely by constructional considerations, both in furnaces with separately fitted regenerators of the usual kind and also in furnaces with recuperators. In the case of coke furnaces the economy of the process results in a 10% to 14% better utilization of the steam.

The invention is in no way limited to the example here illustrated, but in accordance with what has already been stated the process may be carried into practice in all cases where the parts of the heat recuperation installation serving functions which are diverse spatially or in point of time are unequally strained. In no case does the employment of the process entail the use of a special construction.

What I claim is:

1. In a device of the character described, a pair of regenerators having flues, a common passage communicating with the flues of both regenerators and adapted to receive the waste gases, combined with means for withdrawing part of the gases from said passage at the point of draft reversal, substantially as specified.

2. In a device of the character described, a pair of regenerators each having a set of flues, a horizontal passage communicating with the flues of both regenerators and adapted to receive the waste gases, and a duct communicating with the passage intermediate the regenerators and adapted to withdraw part of the gases from said passage, substantially as specified.

Signed by me at Düsseldorf, Germany, this thirty-first day of May 1906.

HEINRICH KOPPERS.

Witnesses:
WILLIAM ESSENWEIN,
ALFRED POHLMEYER.